United States Patent
Fujiwara et al.

(10) Patent No.: US 8,416,799 B2
(45) Date of Patent: Apr. 9, 2013

(54) SYSTEMS, METHODS AND APPARATUSES FOR WIRELESS COMMUNICATION

(75) Inventors: Ryosuke Fujiwara, San Jose, CA (US); Jun Ma, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 189 days.

(21) Appl. No.: 13/101,998

(22) Filed: May 5, 2011

(65) Prior Publication Data

US 2012/0281545 A1    Nov. 8, 2012

(51) Int. Cl.
*H04L 12/42* (2006.01)

(52) U.S. Cl.
USPC .......................................... 370/449; 370/445

(58) Field of Classification Search ................. 370/346, 370/310.2, 328, 338, 445, 449, 447, 442, 370/458

See application file for complete search history.

(56) References Cited

U.S. PATENT DOCUMENTS

| | | | |
|---|---|---|---|
| 5,355,375 A * | 10/1994 | Christensen | 370/407 |
| 5,940,399 A * | 8/1999 | Weizman | 370/445 |
| 7,123,627 B2 | 10/2006 | Kowalski | |
| 7,151,762 B1 | 12/2006 | Ho et al. | |
| 7,330,472 B2 | 2/2008 | Kowalski | |
| 7,418,004 B2 | 8/2008 | Chou | |
| 2006/0050742 A1 | 3/2006 | Grandhi et al. | |
| 2006/0109833 A1 | 5/2006 | Uh et al. | |
| 2006/0126497 A1* | 6/2006 | Na et al. | 370/216 |
| 2007/0014236 A1 | 1/2007 | Jang et al. | |
| 2007/0206545 A1 | 9/2007 | Lee et al. | |
| 2010/0177709 A1 | 7/2010 | Park et al. | |

\* cited by examiner

*Primary Examiner* — Brenda H Pham
(74) *Attorney, Agent, or Firm* — Procopio, Cory, Hargreaves & Savitch, LLP

(57) ABSTRACT

Systems and methods directed towards improving reliability for wireless networks. Selective polling techniques are utilized to selectively poll stations within a wireless network in order to ensure that a station failing to properly transmit data is given an opportunity to rectify the transmission failure. The selective polling techniques can be applied to any polling-based system, thus maintaining backwards compatibility with legacy systems.

18 Claims, 15 Drawing Sheets

SYSTEMS, METHODS AND APPARATUSES FOR WIRELESS COMMUNICATION

BACKGROUND

1. Technical Field

This invention is generally directed to wireless communication, and more specifically, for improving polling-based communication systems by use of selective polling.

2. Background Art

Wireless systems, such as those compliant with the IEEE802.11 MAC protocol, typically have two functions for controlling channel access. One is the Distributed Coordination Function (DCF) based on algorithms such as the Carrier Sense Multiple Access with Collision Avoidance algorithm (CSMA/CA). The other is the Point Coordination Function (PCF). The DCF and PCF utilize various kinds of gaps between sequential transmission signals in order to avoid collisions for channel access. Transmission signals (packets) are organized into "frames," and gaps between two adjacent frames are called IFS (inter frame spacing). Known examples of inter frame spacing include the Short Inter Frame Space (SIFS), the Priority Inter Frame Space (PIFS), and the Distributed Inter Frame Space (DIFS).

FIG. 1 illustrates conventional examples of a time-slotted channel hopping allocation process involving SIFS, PIFS and DIFS, respectively. In FIG. 1, SIFS is the shortest time slot and the PIFS is the second shortest time slot. The transmission after the shorter IFS has the highest priority. Thus, SIFS is normally used in connection with burst transmissions and response access, such as the ACK (acknowledge) signal. PIFS is used for priority access, such as use in connection with a beacon signal.

DIFS is used in connection with the DCF function, which is based on the CSMA/CA. A station (STA) obtains channel access based upon monitoring of the available communication media for an idle condition. The STA also is provided with a random backoff time before it starts sending a packet, in order to avoid conflicting with a packet transmitted by a higher priority STA.

In the PCF function, the Access Point (AP) obtains channel access after it monitors the available communications media for an idle condition based upon the PIFS. As PIFS is shorter than DIFS, the AP may have a higher priority than other STAs. Once the AP obtains channel access, the AP can give STAs a chance to transmit without contention by polling. For example, the AP can send a polling packet, or a Coordination Function Poll (CF-Poll) to a STA and the STA receiving the CF-Poll can transmit data to the AP after the SIFS. This arrangement provides a centralized mechanism that allows the AP to control STAs and provide high efficiency channel access.

The IEEE802.11e standard also provides a MAC extension of an existing IEEE802.11a/b/g MAC through two new mechanisms: Enhanced DCF channel access (EDCA) and Hybrid Coordination Function (HCF) Controlled Channel Access (HCCA). The EDCA extends the legacy DCF function to provide a service differentiation and prioritization mechanism. This mechanism is still based on CSMA/CA, but also introduces Arbitration IFS (AIFS) to make several levels of priority.

Although the EDCA function may provide a parameterized Quality of Service (QoS), it cannot provide adequate deterministic latency as long as it is based on CSMA/CA. Further, the reference scheduler design of the HCCA is not sufficient to ensure deterministic latency because it is not taking packet errors into account. For example, if a STA fails to transmit data to the AP, the STA would have to wait for the next polling packet, which comes with the next SI.

SUMMARY OF THE INVENTION

Technical Problem

Given the foregoing background, there is a need for new systems and methods that will substantially obviate the aforementioned problems associated with conventional techniques for wireless systems. Specifically, there is a need to provide for adequate deterministic latency for control applications that may require better than $10^{-9}$ packet loss rate within 10-ms delivery latency. Additionally, the systems and methods would need to address the following requirements:

Traffic model: There is a need to handle periodic uplink packet transmissions in addition to conventional random bidirectional transmissions. In many applications, the amount of data per packet is relatively small.

Coexistence with legacy WiFi devices: There is a need for ensuring backward compatibility with legacy WiFi devices.

Solution to the Problem

The inventive methodology is directed to methods and systems that substantially obviate one or more of the above and other problems associated with the known conventional techniques for wireless systems.

Aspects of the present invention may include an access point with a wireless transceiver for polling a plurality of stations controlled by the access point. The wireless transceiver may poll the stations according to a schedule with an exhaustive polling phrase, a CSMA phase and a selective polling phase. During the exhaustive polling phase, the access point may poll each of the plurality of stations. If the access point fails to correctly receive data from a station during the exhaustive polling phase, a selective polling phase may be utilized, after the exhaustive polling phase and before the CSMA phase, for selectively polling the failed station.

Aspects of the present invention may also include a method, which involves utilizing a wireless transceiver to poll each station controlled by an access point. The polling may be conducted according to a schedule with an exhaustive polling phrase, a CSMA phase and a selective polling phase. During the exhaustive polling phase, the access point may poll each of the stations. If the access point fails to correctly receive data from a station during the exhaustive polling phase, a selective polling phase may be utilized after the exhaustive polling phase and before the CSMA phase for selectively polling the failed station.

Aspects of the present invention may further include a system involving a plurality of terminal nodes; and an access point polling the plurality of terminal nodes. The polling may be conducted according to a schedule with an exhaustive polling phrase, a CSMA phase and a selective polling phase. During the exhaustive polling phase, the access point may poll each of the plurality of terminal nodes. If the access point fails to correctly receive data from a terminal node during the exhaustive polling phase, a selective polling phase may be utilized after the exhaustive polling phase and before the CSMA phase for selectively polling the failed terminal node.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

Advantageous Effects of the Invention

The present invention attempts to improve on conventional techniques by providing a QoS guarantee which satisfies the above-mentioned requirements. By providing the selective polling techniques according to embodiments of the present invention, deterministic latency and reliability may thereby be improved with a low packet error rate, which is important in wireless systems requiring high reliability (e.g. process automation, factory automation, building automation, video surveillance etc.), while maintaining backwards compatibility with legacy IEEE802.11 MAC systems.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DESCRIPTION OF EMBODIMENTS

In the following detailed description of exemplary embodiments, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer and executed by one or more processors, in the form of a specialized hardware, or combination of software and hardware.

A. Basic Concept of the Proposed Polling Schedulers

HCCA is a polling-based mechanism in which a Hybrid Coordinator (HC) in conjunction with the AP gives transmission opportunities (TXOPs) to STAs. This mechanism improves over the PCF of legacy IEEE 802.11e MAC systems.

According to the concept of transmission opportunities (TXOP) based on the IEEE802.11e standard, once a STA obtains channel access, the STA can send one or more frames within TXOP. During TXOP, acknowledgement (ACK) may be transmitted after each frame, or block-ACK may be transmitted after the last frame.

Figure 1:
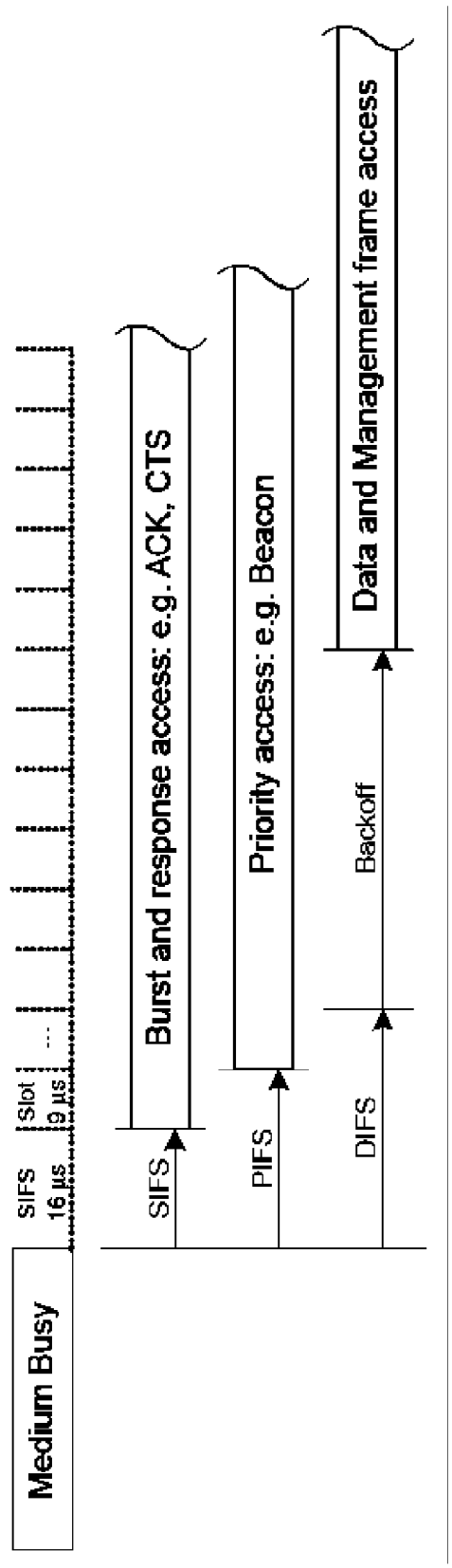
FIG. 1 illustrates examples of time-slotted channel hopping allocation according to the conventional art.
Figure 2:
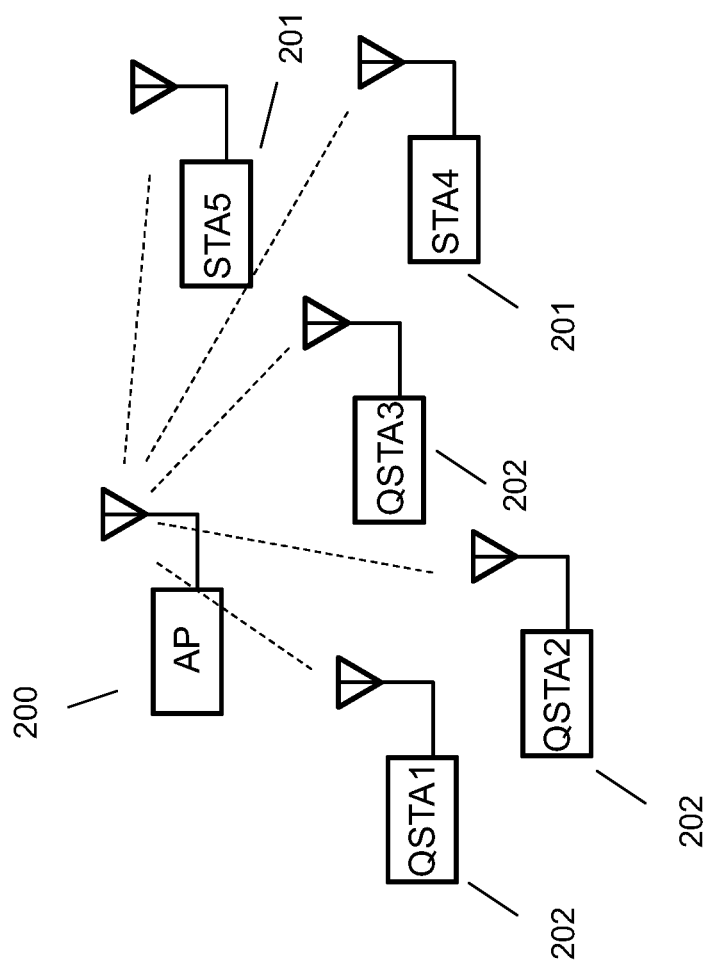
FIG. 2 illustrates an exemplary wireless network.
Figure 3:
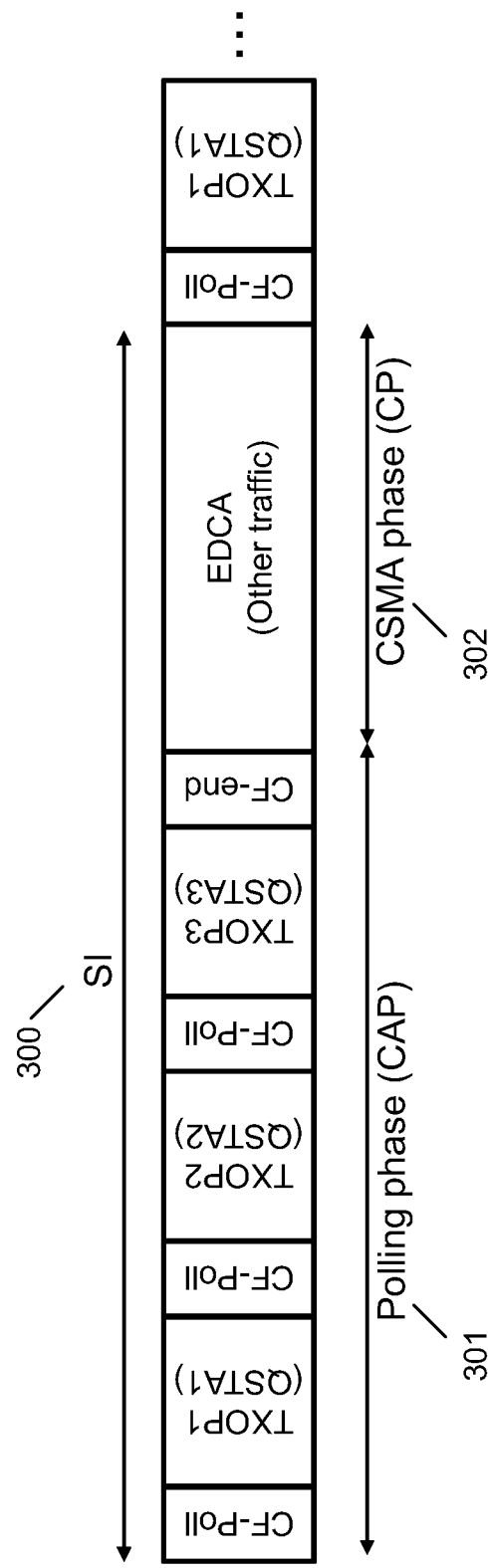
FIG. 3 illustrates an exemplary reference HCCA scheduler protocol.

The IEEE802.11e standard also provides a reference scheduler design to complement the HCCA scheme, as shown in FIG. 2 and FIG. 3.

FIG. 2 illustrates a wireless network architecture with a single AP 200 and several non-AP STAs 201. A STA that has streams admitted by the admission controller in the AP 200 is called a Quality of Service aware Station (QSTA) 202. One or more QSTA's 202 may be present in the network.

FIG. 3 shows an exemplary reference scheduler protocol and schedule for the network architecture of FIG. 2. The scheduler determines a Scheduled Service Interval (SI) 300, which is the time interval used by the AP to periodically poll each non-AP STA (QSTA) that has one or more streams admitted by the admission controller in the AP. Any QSTA is able to get a TXOP within a SI. This phase of the polling phase is called a CAP (controlled access period) 301. A CSMA phase (CP) 302 based on the EDCA mechanism follows the CAP.

The basic embodiments of the present invention provide MAC and scheduler designs that ensure a QoS guarantee that satisfies the aforementioned requirements.

In various embodiments of the invention that are described subsequently, a scheduled service interval (SI), which is the time interval used by the access point (AP) to periodically poll each non-AP STA (station), is divided into three periods: an exhaustive polling phase, a selective polling phase and a CSMA phase.

In the exhaustive polling phase, the AP polls all STAs which require QoS transmissions. Each STA transmits its data after it receives the transmitted polling packet itself.

In the selective polling phase, the AP polls all STAs from which the AP failed to receive data in the exhaustive polling phase. The AP continues to poll the STAs until the AP successfully received data from all of the STAs.

The CSMA phase is a period for communications from legacy devices, based on the CSMA (carrier sense multiple access) mechanism. Other streams are communicated in this period. Also, the STAs may communicate some configuration packets with the AP in this period.

The length of the SI is determined in advance, but the length of the three periods depends upon the results of transmissions in the exhaustive polling phase.

Figure 4:
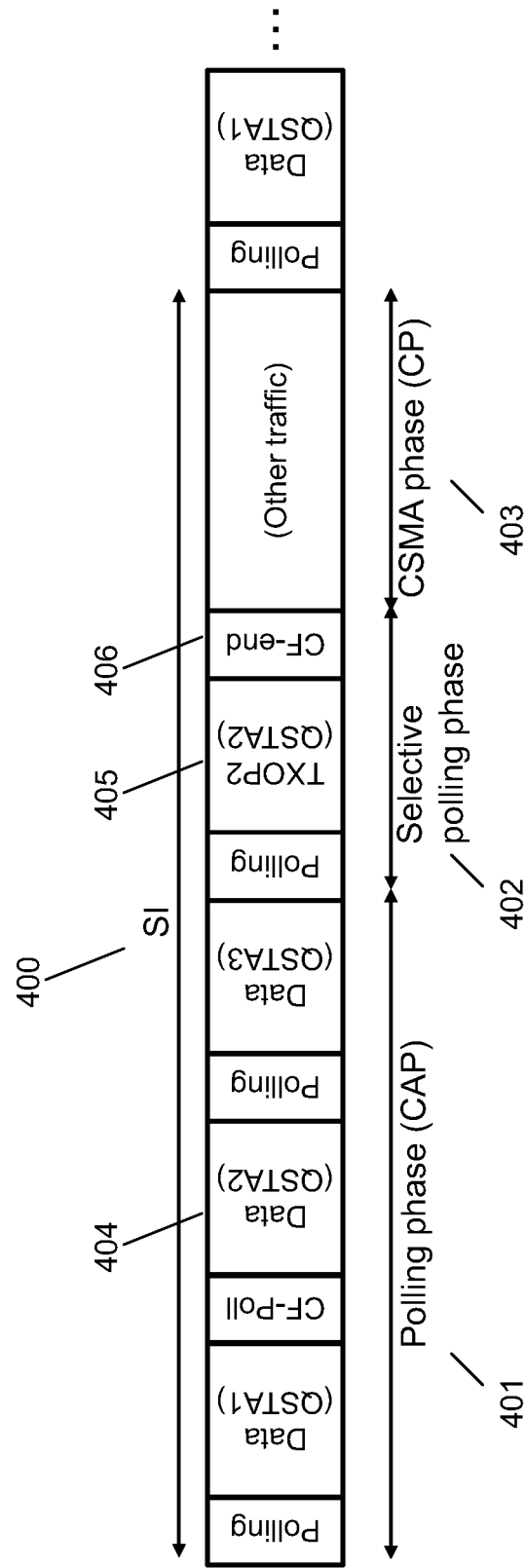
FIG. 4 illustrates an exemplary polling scheduler design according to embodiments of the invention.

FIG. 4 illustrates an exemplary scheduler protocol for polling-based channel access according to embodiments of the invention. The scheduler divides the SI 400 into three periods: an exhaustive polling phase (CAP) 401, a selective polling phase 402 and CSMA phase (CP) 403.

In the exhaustive polling phase 401, the AP polls all QSTAs, which means non-AP STAs that have one or more streams admitted by the admission controller in the AP. Each polled QSTA transmits its data after it receives the polling packet. In the selective polling phase 402, the AP polls the QSTAs that failed to provide a transmission in the exhaustive polling phase. The AP continues to poll the QSTAs until the AP successfully receives data from all of the QSTAs.

The CSMA phase 403 is for communications of legacy devices based on the CSMA (carrier sense multiple access) mechanism. Stations other than the QSTAs communicate in this period. Also, all STAs may communicate some configuration packets with the AP in this period.

In the example of FIG. 4, QSTA2 404 fails to transmit the data in the exhaustive polling phase. Therefore, the AP polls QSTA2 again 405 in the selective polling phase after the AP finishes polling all the QSTAs. If the AP successfully receives data from QSTA2, as the last QSTA to transmit data, the AP ends the selective polling phase, which is denoted by a CF-end packet 406.

Figure 5:
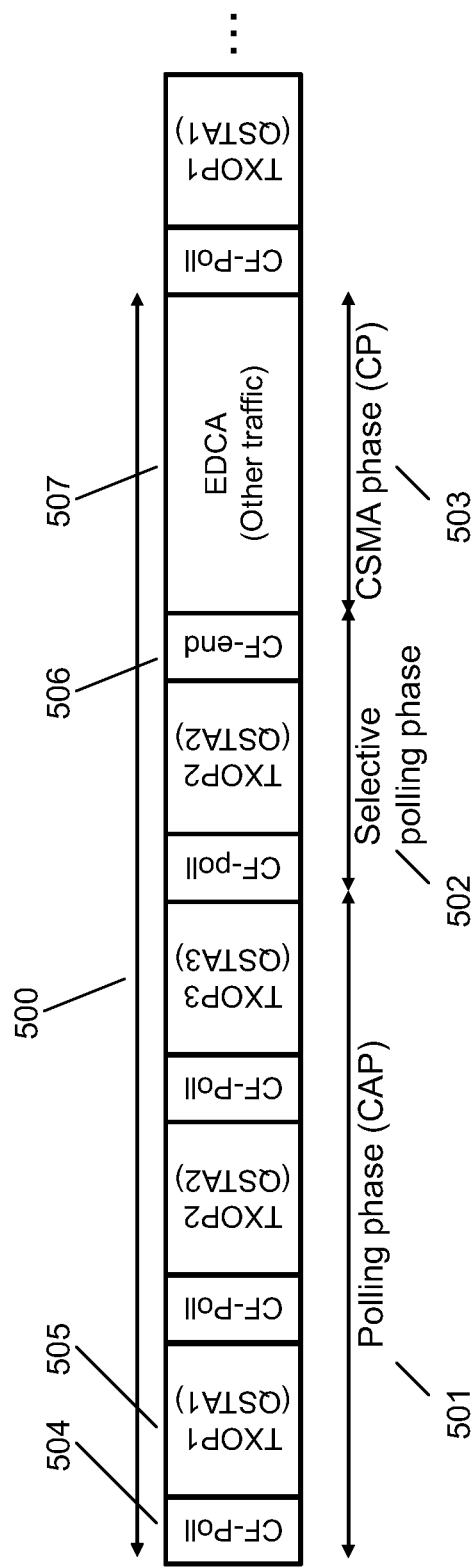
FIG. 5 illustrates an exemplary HCCA scheduler design according to embodiments of the invention.

FIG. 5 illustrates an exemplary HCCA scheduler protocol according to another exemplary embodiment of the invention. There, the AP sends a CF-poll (Contention Free-Poll) packet 504 as polling to each of the QSTAs. Once a QSTA receives the CF-poll, the selected QSTA can get channel access during TXOP 505, which is included in the CF-poll packet. Within the SI 500, at the end of the polling phase 501, a selective polling 502 of the type previously described will begin and is concluded by a CF-end packet 506 that also marks the beginning of the CSMA phase (CP) 503.

At the end of the exhaustive phase, if the AP has not received all data from the QSTAs, the AP sends new NAV (Network Allocation Vector) to an expected duration of the selective polling phase by using a CF-poll packet. The NAV shows period in which the channel will be occupied, other STAs, which received the packets with the NAV and did not selected to transmit the data, cannot transmit packets for the duration which is specified by the NAV. The CP period 503 that occurs after the selective polling phase 502 is used for EDCA-based channel access 507.

B. Example Implementations of Embodiments

Several exemplary implementations of embodiments of the invention are explained below. The implementations are not limited to the systems based on the IEEE802.11e standard and can be applied for all polling-based systems.

First Embodiment

CF-Poll with ACK

Figure 6:
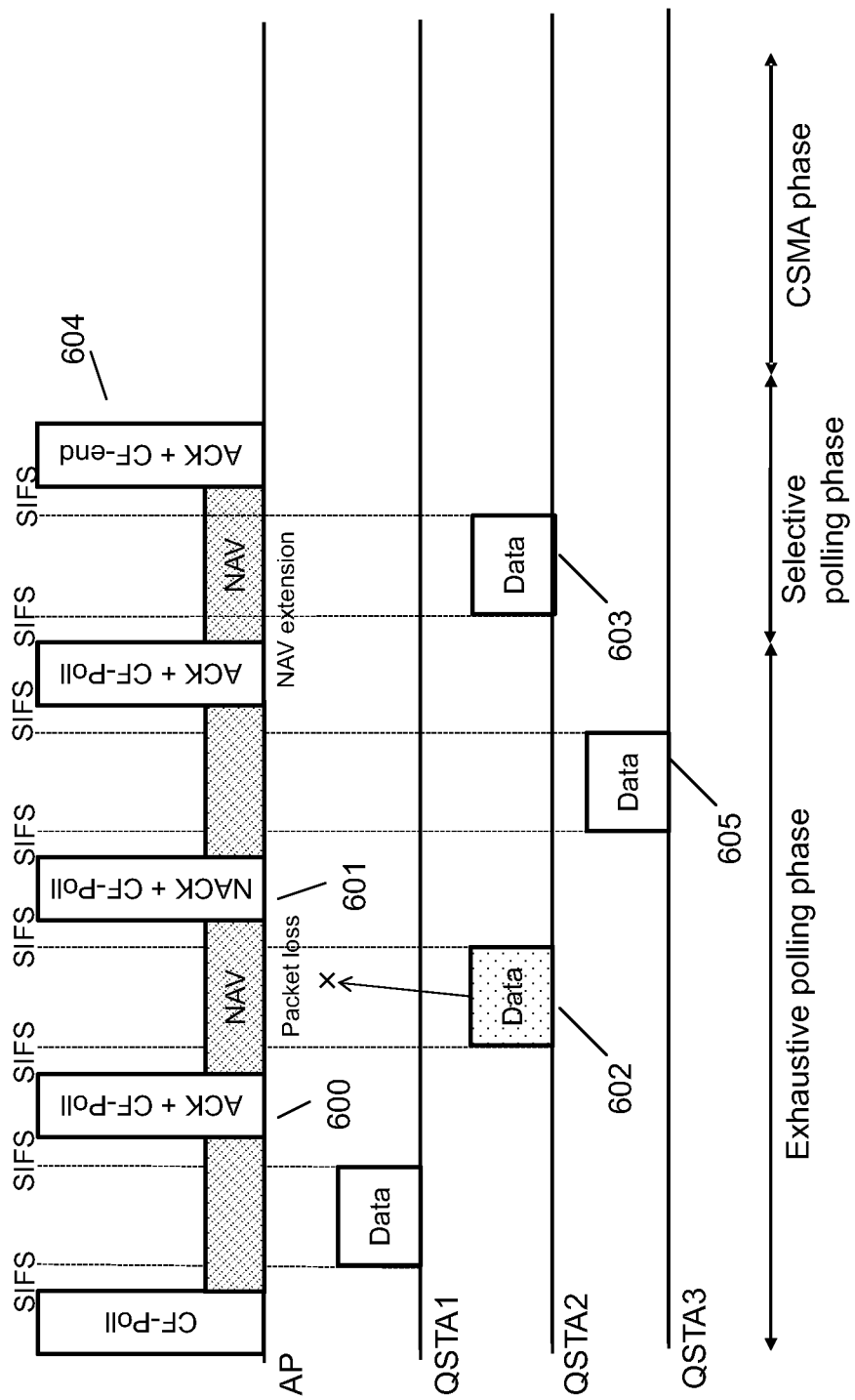
FIG. 6 illustrates an exemplary time diagram when the access point fails to correctly receive a packet due to bit error, according to embodiments of the invention.

FIG. 6 illustrates an exemplary time diagram of the first embodiment. Specifically, FIG. 6 shows the time diagram in a case that the AP fails to correctly receive a packet due to bit error from QSTA2 in the exhaustive polling phase.

In this embodiment, the AP sends a CF-poll with ACK, which is for the previous QSTA data transmission. In the exhaustive polling phase, the AP sends a CF-poll to the QSTA1 and sends a CF Poll with an ACK 600 to the QSTA2. Also, the AP sends a CF-poll to the QSTA3 with a Negative Acknowledgement (NACK) 601 to the QSTA2 as the AP fails to correctly receive the data 602 from QSTA2. After the AP receives the data 605 from QSTA3, the AP resends a CF-poll to the QSTA2 to get the data 603 from QSTA2. Finally, once the AP successfully receives the data 603 from the QSTA2, the AP ends the CAP 604, which is the polling-based channel access period.

Figure 7:
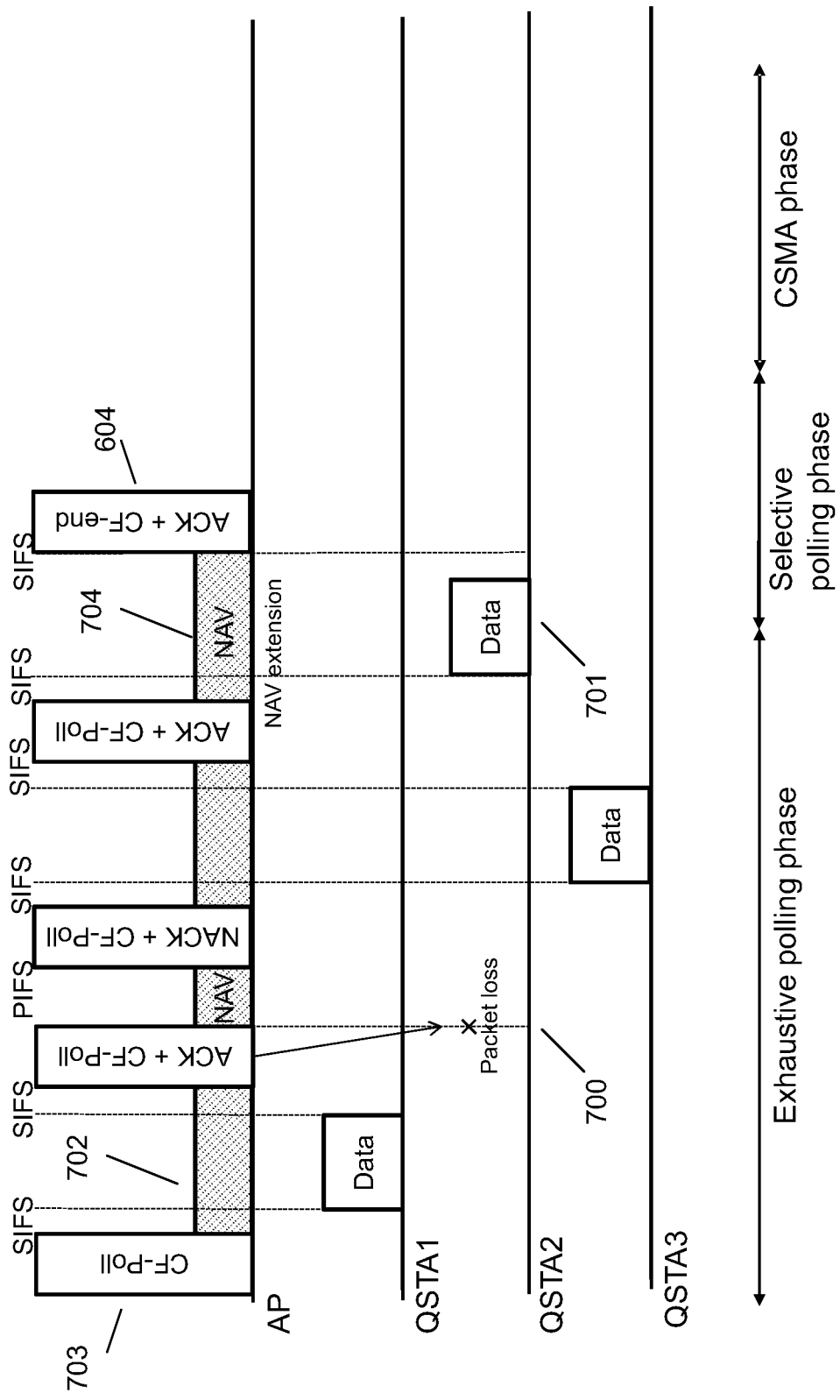
FIG. 7 illustrates an exemplary time diagram when the access point fails to detect a packet from the QSTA according to embodiments of the invention.

FIG. 7 illustrates an exemplary a time diagram of the first embodiment in the case that the AP cannot detect the packet from QSTA2. This situation occurs when the CF-poll doesn't reach the QSTA, or the AP misses the packet from QSTA2, resulting in a packet loss 700. In this case, since the AP cannot receive any packet within PIFS after the AP finishes sending CF-poll, the AP sends the next CF-poll to get the data from QSTA3. After the AP receives the data from QSTA3, the AP resends data 701 on the basis of a CF-poll to the QSTA2 in order to get all of the data from QSTA2. Finally, once the AP successfully receives the data 701 from the QSTA2, the AP ends the CAP 604, which is the polling-based channel access period.

The AP may set the NAV (Network Allocation Vector) 702 in the CF-poll packet to the duration of the exhaustive phase 703. Other STAs, which receive the packets with the NAV, cannot transmit packets for the duration which is specified by the NAV. At the end of the exhaustive phase, if the AP has not received all data from the QSTAs, the AP may extend the NAV 704 to an expected duration of the following selective polling phase by using a CF-poll packet. If the AP has not received all the data at the end of the duration specified by the NAV, the AP may extend the NAV to the duration of the following selective polling phase again. The AP can reset the NAV by using the CF-end packet 604.

Each CF-poll packet can convey the NAV information. Therefore, the NAV can be extended by each CF-poll packet by calculating how long it takes to finish all transmissions for data not yet successfully received by the AP.

Figure 8:
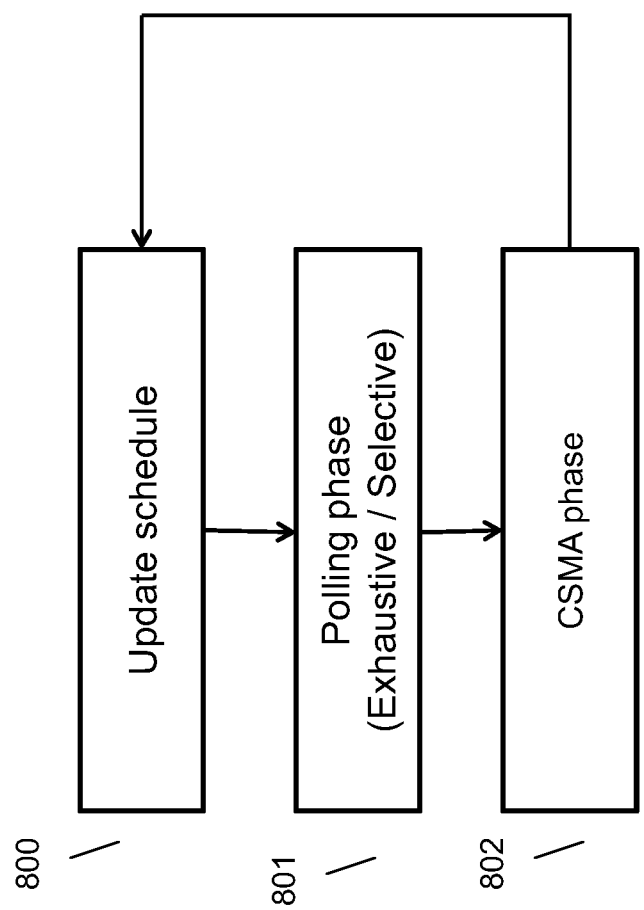
FIG. 8 illustrates an exemplary flowchart of the access point, according to embodiments of the invention.

FIG. 8 illustrates an exemplary flowchart of the AP's behavior according to exemplary embodiments of the invention. The AP determines the next schedule before each SI 800. According to the determined schedule, the AP controls channel accesses, both exhaustive and selective, in the polling phase 801. Then the conventional CSMA-based channel access period 802 follows and, upon completion, returns to the schedule update step.

Figure 9:
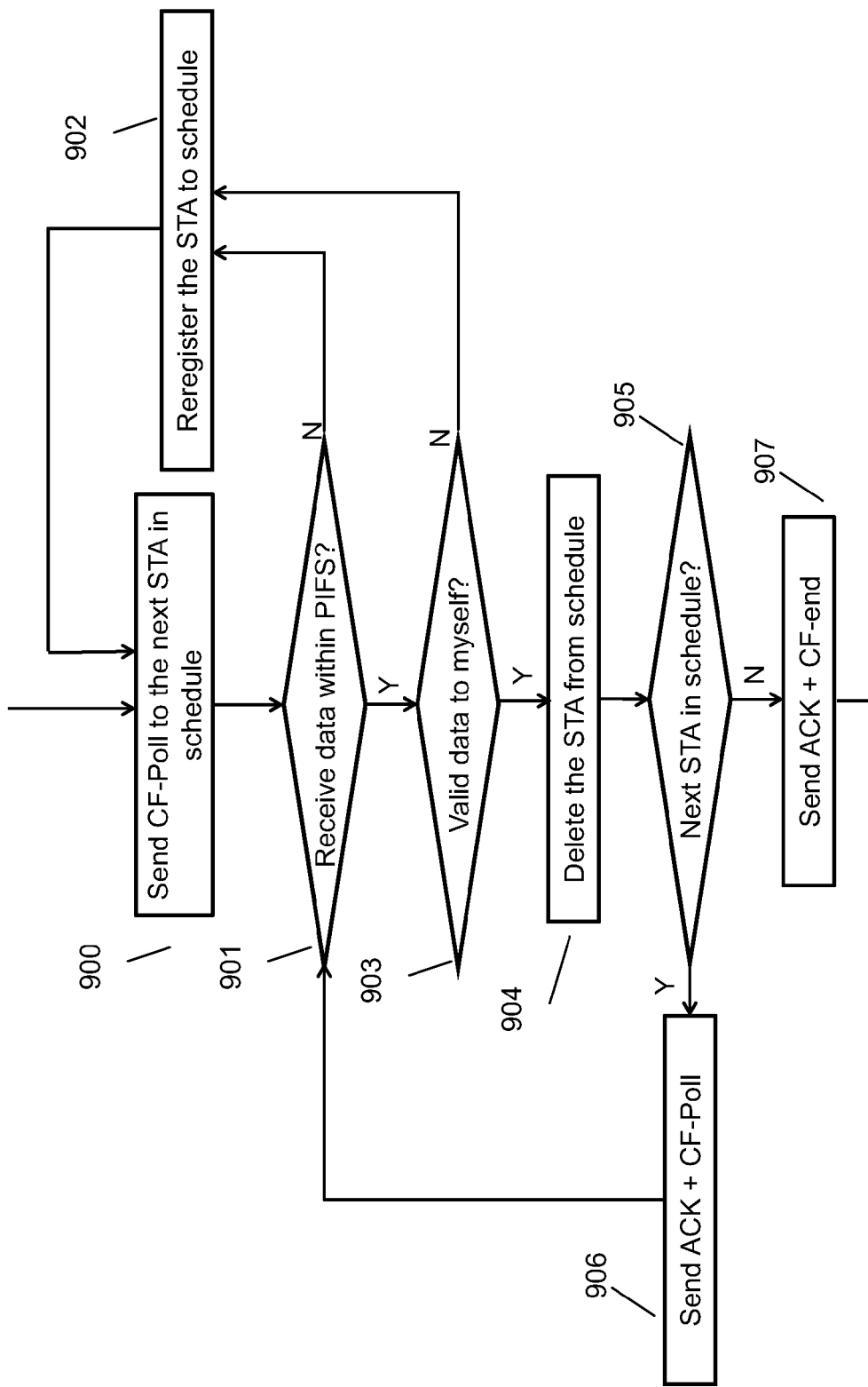
FIG. 9 illustrates an exemplary flowchart of the polling phase according to embodiments of the invention.

FIG. 9 illustrates an exemplary flowchart of the polling phase in FIG. 8 according to embodiments of the invention. First of all, the AP sends a CF-poll to the first QSTA which is listed in the determined schedule 900. After that, the AP waits for coming packet for PIFS 901. If a packet is not received within PIFS (N), the AP re-registers the QSTA 902 into the schedule and the AP again sends a CF-poll to the next QSTA 900. If a packet is received (Y), the AP checks if the packet is a valid data transmitted from the QSTA to the AP 903. If it's not a valid packet (N), the AP re-registers the QSTA 902 into the schedule and the AP again sends a CF-poll to the next QSTA 900. If the packet is a valid packet (Y), the AP deletes the QSTA from the schedule 904 and then the AP checks to see if there is a next STA in the schedule 905. If there is a next STA, the AP sends a CF-poll to the next QSTA if any 906. The CF-poll can include ACK to the current QSTA. If no STA in the list exists (N), the AP may broadcast a CF-end to notify that the polling phase is ended 907.

Figure 10:
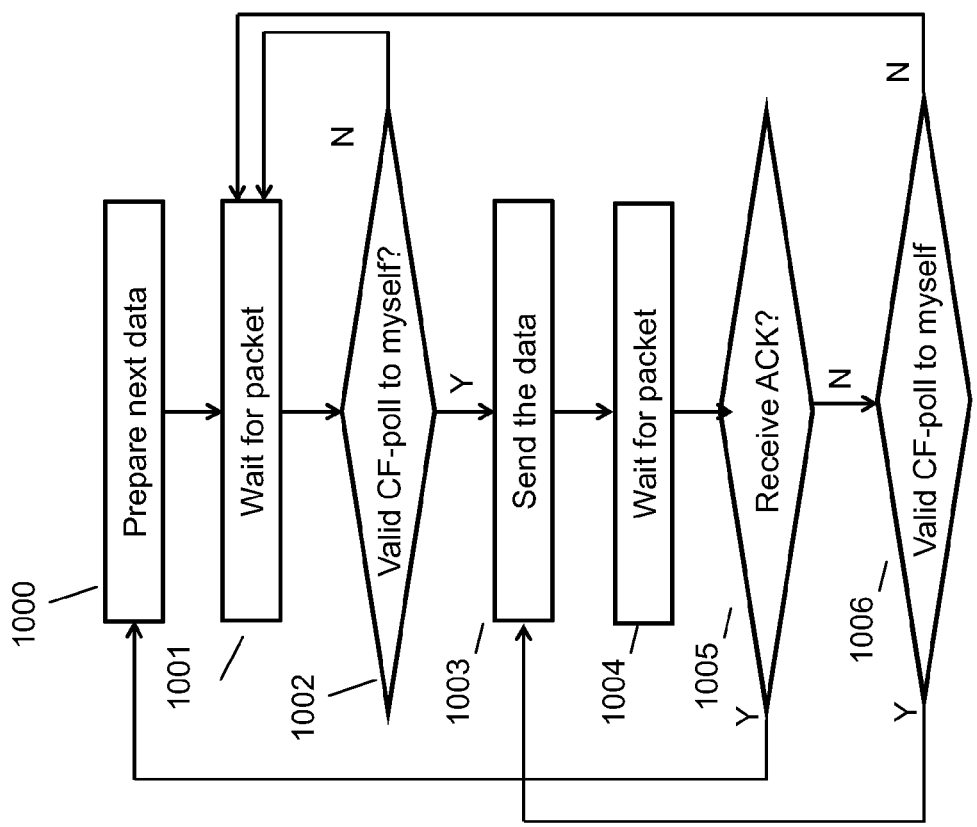
FIG. 10 illustrates an exemplary flowchart of a Quality of Service aware station (QSTA), according to embodiments of the invention.

FIG. 10 illustrates an exemplary flowchart of the QSTA's behavior according to embodiments of the invention. A QSTA, which has a data stream for transmission to the AP, prepares a data packet for the next transmission 1000. The QSTA waits for the CF-poll 1001, which is transmitted to the QSTA, and upon receipt checks whether a valid CF poll has been sent to itself 1002. If a next valid packet is not received (N), the process returns to waiting for a next packet 1001. If the QSTA receives a correct CF-poll (Y), the QSTA sends the data packet 1003 and waits for the next packet 1004. A check is made as to whether the ACK has been received 1005. If a packet including ACK to the QSTA is received (Y), the QSTA goes to the preparation for the next data transmission 1000. If ACK is not received and then the next CF-poll to the QSTA is received, the QSTA retransmits the same data 1006. The timeout mechanism or no limited re-transmission mechanism may be applied appropriately in this example if necessary.

Figure 11:
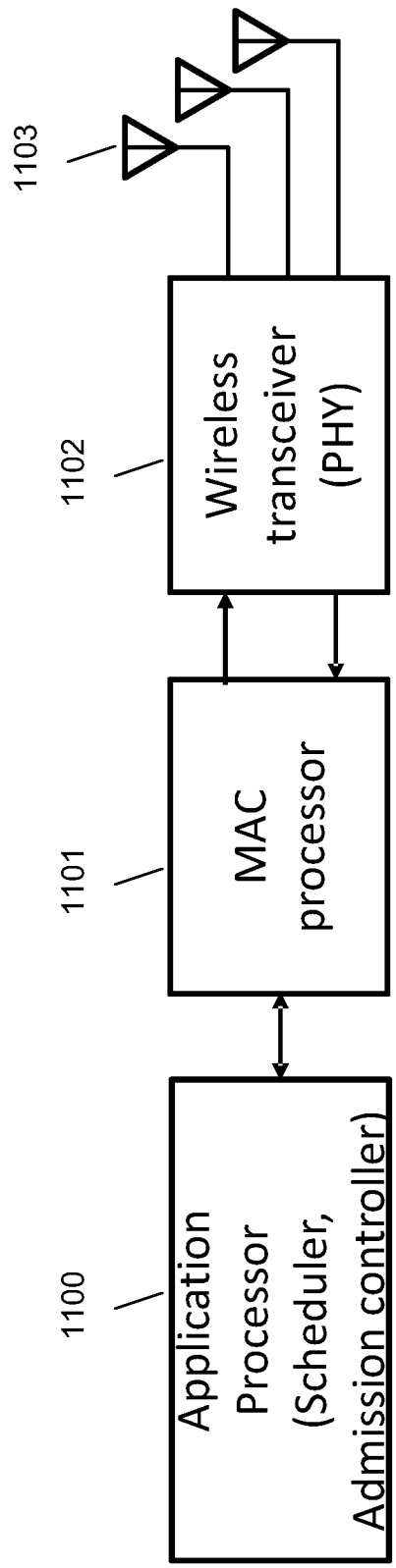
FIG. 11 illustrates an exemplary block diagram of the access point, according to embodiments of the invention.

FIG. 11 illustrates an exemplary block diagram of an AP structure to implement embodiments of the invention. The AP includes a wireless transceiver 1100, a MAC processor 1101 and an application processor 1102. The wireless transceiver may have multiple antennas 1103 to perform MIMO techniques or diversity techniques. The MAC processor 1101 controls channel access, which may be provided through the EDCA or HCCA mechanisms. The application processor 1102 treats other upper layer control. That includes a scheduler in which the proposed techniques can be implemented. Also, the application processor 1102 may include a admission controller, which grants data streams transmitted in the polling phase.

Second Embodiment

Bidirectional Communication

Figure 12:
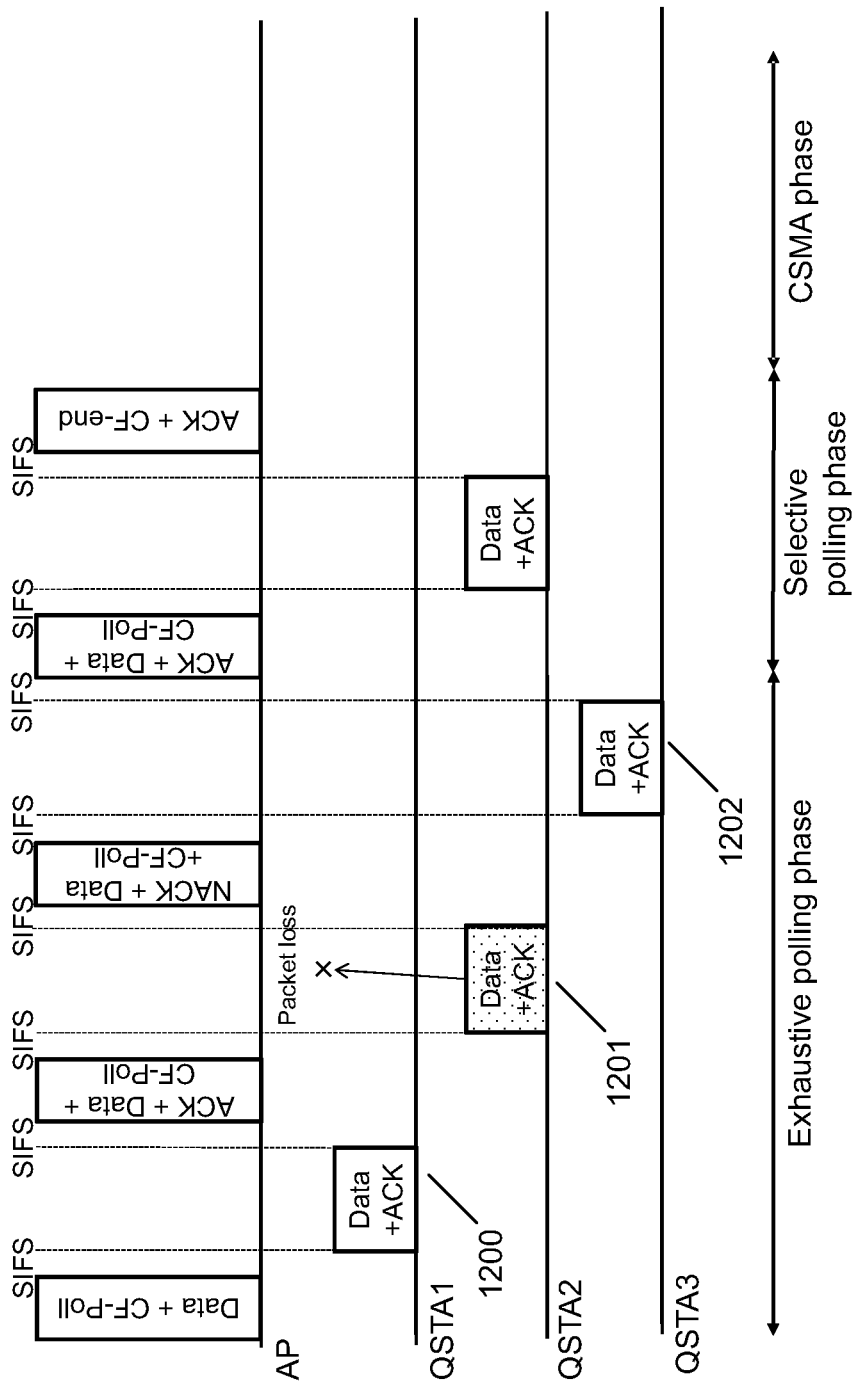
FIG. 12 illustrates an exemplary time diagram of a scheduler for bi-directional transmission, according to embodiments of the invention.

FIG. 12 illustrates an exemplary time diagram of the proposed scheduler in a bi-directional transmission situation, according to the second embodiment of the invention.

If the AP has data streams to some QSTAs, the AP may include the data into CF-poll packets as shown in FIG. 12. The QSTA, which receives the CF-poll with the data, may send a data packet with ACK 1200 to the received data. If either of data to the QSTA and data to the AP is lost during the exhaustive phase 1201, the AP can resend the CF-poll with the data to the QSTA in the selective phase 1202 until all data are successfully received by the AP and the QSTA.

Third Embodiment

Consolidated Polling Packet

Figure 13:
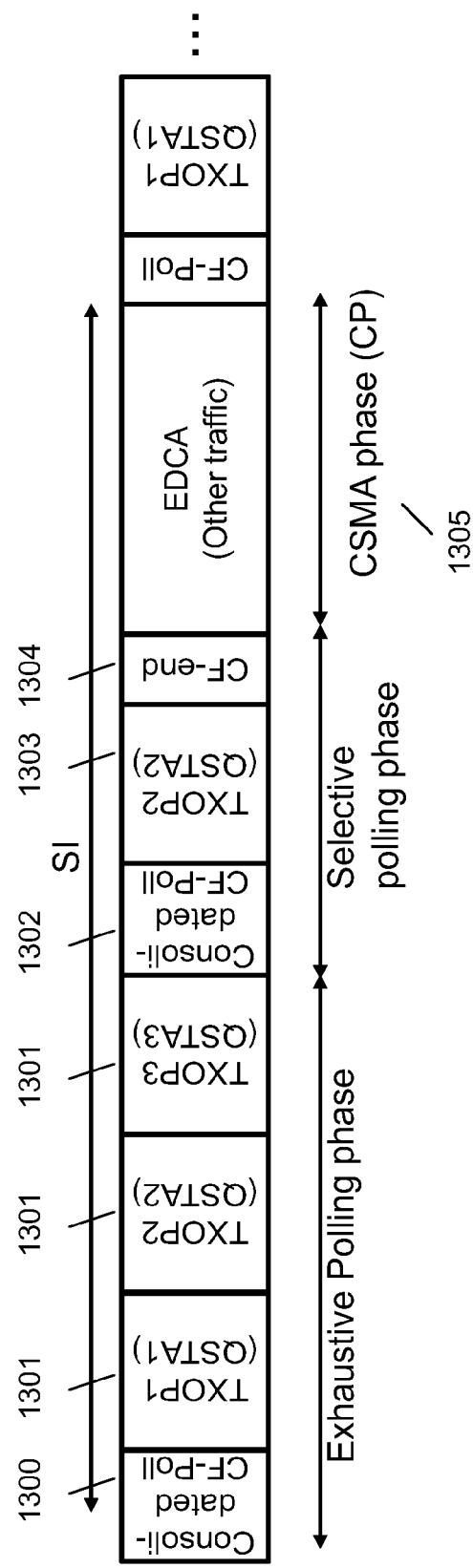
FIG. 13 illustrates an exemplary polling scheduler protocol with a consolidated CF-poll, according to embodiments of the invention.

FIG. 13 illustrates the protocol for an embodiment of the invention utilizing a consolidated CF-poll. According to this embodiment, all CF-polls are consolidated into one CF-poll. The consolidated CF-poll 1300 specifies the granted data streams which can be transmitted in the exhaustive polling phase and the order of transmission. Each QSTA (QSTA1-QSTA3) transmits data according to the order specified by the CF-poll 1301. After the exhaustive polling phase, the AP sends the next consolidated CF-poll 1302, which specifies the granted data stream(s) that the AP did not receive in the exhaustive polling phase, for example, TXOP2 1303. The AP continues to send consolidated CF-polls until all the granted data streams are successfully received within the SI, and ends the polling phase with a CF-end 1304. Subsequently, the CSMA phase 1305 is conducted.

Fourth Embodiment

Shared Slots in TDMA (Time Division Multiple Access)

Figure 14:
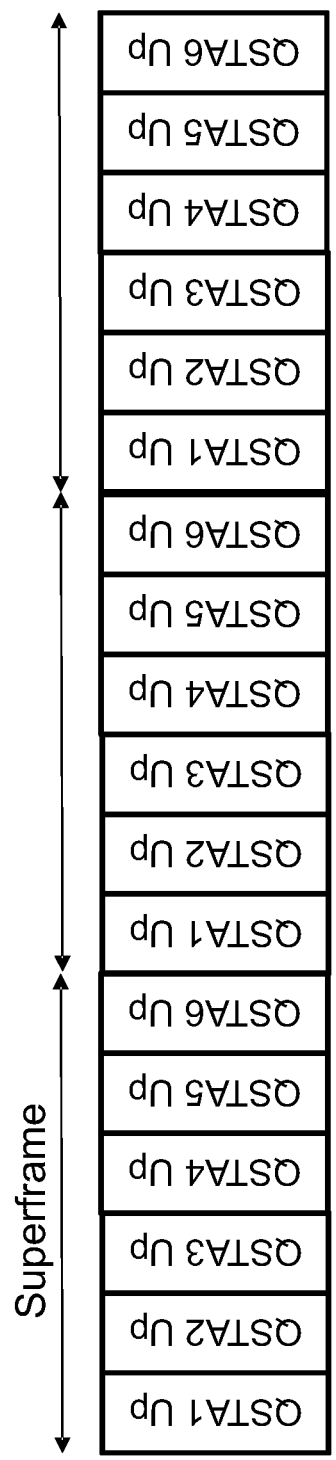
FIG. 14 illustrates an exemplary superframe structure of a TDMA system, according to the conventional art.

The previously described embodiments of the invention may also be applied to TDMA (time division multiple access) systems by utilizing a shared slot concept. FIG. 14 illustrates a typical TDMA system according to the conventional art. Typical TDMA systems allocate one slot per STA, as shown in FIG. 14. The TDMA system of FIG. 14 consists of 6 STAs and the superframe used in the TDMA system consists of 6 time slots those are allocated to each STA.

Figure 15:
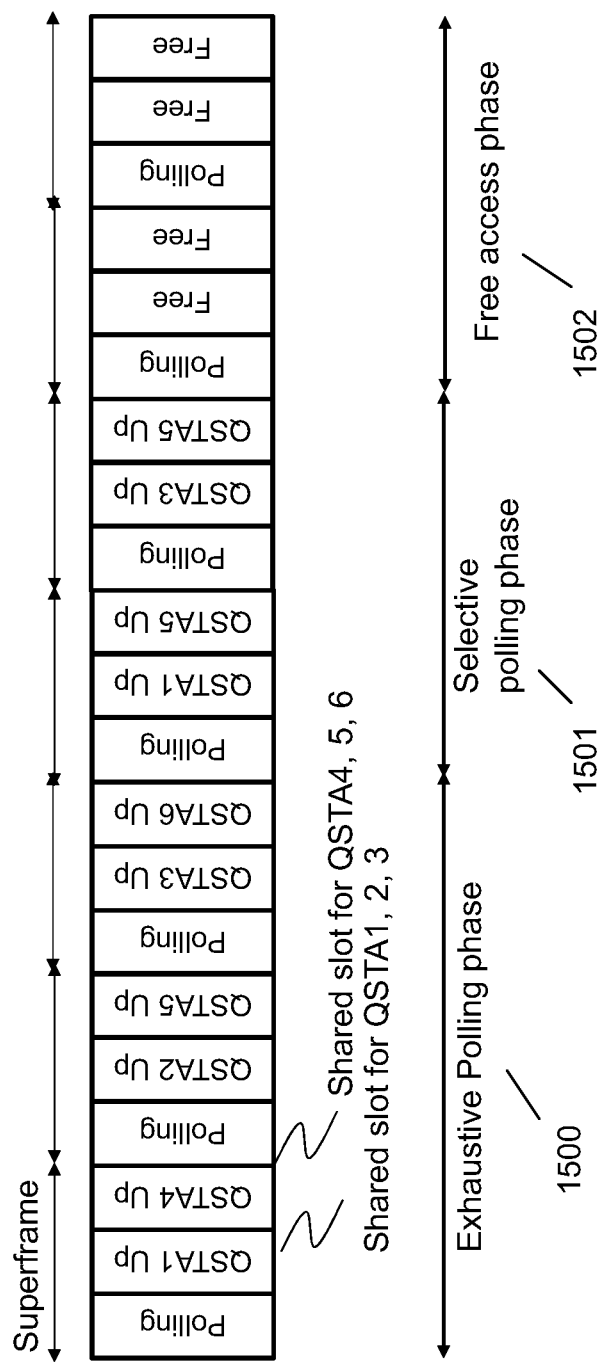
FIG. 15 illustrates an exemplary superframe structure and scheduling example with a shared slot in a TDMA system, according to embodiments of the invention.

With a shared slot concept according to an embodiment of the invention, a time slot is shared by several STAs as shown in FIG. 15. The superframe of this example contains two time slots and one polling slot. One time slot is shared with QSTA1, QSTA2 and QSTA3 and the other time slot is shared with QSTA4, QSTA5 and QSTA6. In the exhaustive polling phase 1500, the AP polls all the STAs that share a time slot. After the exhaustive polling phase, in the selective polling phase 1501, the AP polls the STAs that failed to transmit in the exhaustive polling phase (e,g., QSTA1, QSTA3, QSTA5). If all the QSTAs successfully transmit, the rest of the time slots are used for free access during the free access phase 1502.

This concept enables high efficient communication, even in poor radio environments. Typical TDMA systems must reserve extra time slots to ensure reliable transmissions in adverse radio environments, and this practice decreases the communication efficiency of the system. The embodiments of the invention regarding the shared time slot help to address this issue.

Finally, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus.

Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the invention will be apparent to those skilled in the art from consideration of the specification and practice of the invention disclosed herein. Various aspects and/or components of the described embodiments may be used singly or in any combination in a communication system. It is intended that the specification and examples be considered as exemplary only, with a true scope and spirit of the invention being indicated by the following claims.

What is claimed is:

1. An access point, comprising:
a wireless transceiver for polling a plurality of stations controlled by the access point;
wherein the wireless transceiver polls the plurality of stations according to a schedule, the schedule comprising:
an exhaustive polling phase for polling each of said plurality of stations;
a Carrier Sense Multiple Access (CSMA) phase after the exhaustive polling phase; and
a selective polling phase after the exhaustive polling phase and before the CSMA phase for selectively polling a failed station of said plurality of stations, if the access point fails to correctly receive data from the failed station during the exhaustive polling phase.

2. The access point of claim 1, wherein the polling each of said plurality of stations comprises sending a Negative Acknowledgement (NACK) to the failed station during the exhaustive polling phase;
wherein the selectively polling the failed station comprises sending a polling packet to the failed station during the selective polling phase.

3. The access point of claim 1, wherein the selectively polling the failed station comprises sending a polling packet to the failed station during the selective polling phase if no data is detected for the failed station within a Inter Frame Space (IFS) which is a gap before sending a polling packet during the exhaustive polling phase.

4. The access point of claim 1, wherein the polling said each of said plurality of stations further comprises sending a network allocation vector (NAV) which shows period in which the channel will be occupied to said each of said plurality of stations; and
wherein if the access point fails to correctly receive data from the failed station during the exhaustive polling phase, the access point extends the NAV by a duration of the selective polling phase.

5. The access point of claim 1, wherein the polling said each of said plurality of stations comprises sending a data stream for transmission and a polling packet;
wherein correctly receiving data comprises correctly receiving an Acknowledgment (ACK) and the data stream for transmission.

6. The access point of claim 1, wherein polling said each of said plurality of stations comprises:
consolidating all polling packets for all of said each of said plurality of stations into a first single consolidated polling packet;
transmitting the first single consolidated polling packet and the schedule to said each of said plurality of stations; and
creating a second single consolidated polling packet and transmitting the second single consolidated polling packet to the failed station if the access point fails to correctly receive data from the failed station during the exhaustive polling phase.

7. A method, comprising:
utilizing a wireless transceiver to poll each station controlled by an access point;
wherein the polling said each station controlled by the access point is conducted according to a schedule, the schedule comprising:
an exhaustive polling phase for polling said each station;
a Carrier Sense Multiple Access (CSMA) phase after the exhaustive polling phase; and
a selective polling phase after the exhaustive polling phase and before the CSMA phase for selectively polling a failed station of said each station if the access point fails to correctly receive data from the failed station during the exhaustive polling phase.

8. The method of claim 7, wherein the polling said each station comprises sending a Negative Acknowledgement (NACK) to the failed station during the exhaustive polling phase;
wherein the selectively polling the failed station comprises sending a polling packet to the failed station during the selective polling phase.

9. The method of claim 7, wherein the polling said each station further comprises sending a polling packet to the failed station during the selective polling phase if no data is detected for the failed station within a inter frame space (IFS) which is a gap before sending a polling packet during the exhaustive polling phase.

10. The method of claim 7, wherein the polling said each station further comprises sending a network allocation vector (NAV) which shows period in which the channel will be occupied to said each station; and
wherein if the access point fails to correctly receive data from the failed station during the exhaustive polling phase, the access point extends the NAV by a duration of the selective polling phase.

11. The method of claim 7, wherein the polling said each station comprises sending a packet to said each station, the packet comprising an Acknowledgement (ACK), a data stream for transmission and a polling packet;
wherein correctly receiving data comprises receiving an ACK and the data stream for transmission.

12. The method of claim 7, wherein polling said each station comprises:
consolidating polling packets corresponding to said each station into a first single consolidated polling packet;
transmitting the first single consolidated polling packet and the schedule to said each station; and
creating a second single consolidated polling packet and transmitting the second single consolidated polling packet to the failed station if the access point fails to correctly receive data from the failed station during the exhaustive polling phase.

13. A system, comprising:
a plurality of terminal nodes; and
an access point polling the plurality of terminal nodes;
wherein the polling the plurality of terminal nodes is conducted according to a schedule, the schedule comprising:
an exhaustive polling phase for polling each of said plurality of terminal nodes;
a Carrier Sense Multiple Access (CSMA) phase after the exhaustive polling phase; and
a selective polling phase after the exhaustive polling phase and before the CSMA phase for selectively polling a failed terminal node from the plurality of terminal nodes if the access point fails to correctly receive data from the failed terminal node during the exhaustive polling phase.

14. The system of claim 13, wherein the polling each of said plurality of terminal nodes comprises sending a Negative Acknowledgement (NACK) to the failed terminal node during the exhaustive polling phase;
wherein the selectively polling the failed terminal node comprises sending a polling packet to the failed terminal node during the selective polling phase.

15. The system of claim 13, wherein the polling each of said plurality of terminal nodes further comprises sending a polling packet to the failed terminal node during the selective polling phase if no data is detected for the failed terminal node within a inter frame space (IFS) which is a gap before sending a polling packet during the exhaustive polling phase.

16. The system of claim 13, wherein the polling each of said plurality of terminal nodes further comprises sending a network allocation vector (NAV) which shows period in which the channel will be occupied to said each of said plurality of terminal nodes; and
wherein if the access point fails to correctly receive data from the failed terminal node during the polling phase, the access point extends the NAV by a duration of the selective polling phase.

17. The system of claim 13, wherein the polling each of said plurality of terminal nodes comprises sending a packet to said each of said plurality of terminal nodes, the packet comprising an Acknowledgement (ACK), a data stream for transmission and a polling packet;
wherein correctly receiving data comprises receiving an ACK and the data stream for transmission.

18. The system of claim 13, wherein polling said each of said plurality of terminal nodes comprises:
consolidating polling packets corresponding to said each of said plurality of terminal nodes into a first single consolidated polling packet;
transmitting the first single consolidated polling packet and the schedule to said each of said plurality of terminal nodes; and
creating a second single consolidated polling packet and transmitting the second single consolidated polling packet to the failed terminal node if the access point fails to correctly receive data from the failed terminal node during the exhaustive polling phase.

* * * * *